United States Patent [19]
Gavillet et al.

[11] 3,770,033
[45] Nov. 6, 1973

[54] MOLDED HANDLE FOR IMPACT TOOLS

[76] Inventors: Charles R. Gavillet, Carthage, Ill.;
Dale L. Hagmeier; Gregory K. Harris, both of Keokuk, Iowa

[22] Filed: Dec. 10, 1971

[21] Appl. No.: 206,678

[52] U.S. Cl............. 145/61 C, 145/61 H, 145/61 M
[51] Int. Cl.............................................. B25g 1/10
[58] Field of Search................ 16/110 R; 81/177 R;
145/2 R, 29 R, 61 R, 61 A, 61 B, 61 C, 61 F,
145, 61 M, 61 H; 161/160, 161; 273/67 R,
72 R, 273, 80, 81 R, 84; 264/DIG. 14

[56] References Cited
UNITED STATES PATENTS
2,940,492  6/1960  Curry............................... 145/29 R
3,478,134  11/1969  Gruss................................. 161/160

Primary Examiner—James L. Jones, Jr.
Assistant Examiner—Mark S. Bicks
Attorney—Austin P. Dodge et al.

[57] ABSTRACT

The disclosure concerns easily replaceable handles for impact tools, such as hammers, axes and sledges, which comprise a molded body made of a rigid structural plastic foam, and a reinforcing core made of a higher strength material.

4 Claims, 3 Drawing Figures

PATENTED NOV 6 1973 3,770,033

MOLDED HANDLE FOR IMPACT TOOLS

BACKGROUND AND SUMMARY OF THE INVENTION

Traditionally, impact tools, such as hammers, sledges, picks, axes and hatches, have been equipped with handles made of wood. Although wood does possess certain characteristics which partially justify this long-standing practice, it nevertheless has recognized disadvantages. Among these are lack of dimensional stability, the occurrence of hidden defects, and the tendency of the fibers to separate, and allow detachment of the tool head, following development of a crack in the handle. Moreover, the shaping and fitting required to insure proper alignment of the tool head exceed the capabilities of many tool users and frequently preclude satisfactory handle replacement. These disadvantages, coupled with the growing scarcity of good handle wood, have given rise to efforts to find an an acceptable substitute, and the prior art contains many examples of various metal, rigid plastic and fiberglass reinforced-rigid plastic handles. However, none of the proposals of which we are aware is completely satisfactory. Most are inferior to wood as regards flexibility and shock absorption, and none of the substitute handles is capable of being replaced using only the simple tools available to the average user.

The object of this invention is to provide an improved, easily replaceable handle for impact tools. According to the invention, the new handle comprises a body of rigid structural plastic foam which is molded to the desired shape around a reinforcing core which extends throughout the length of the handle. This new handle is comparable to its wooden counterpart as far as weight, cost and ease of working (i.e., stock removal) are concerned, and it is superior from the standpoint of strength, safety, uniformity, shock absorption and dimensional stability. Moreover, the new handle can be attached to a tool head using the simple wedging techniques employed with wooden handles, and, since the handle is molded, intelligent use of quality control procedures will insure alignment of head and handle and permit installation with little or no shaping of the eye-engaging end. Finally, since operational properties such as balance and flexibility can be controlled easily by varying the cross sectional area and shape of the core and foam body or by changing the materials used in these components, the invention affords to the handle manufacturer the degree of freedom needed to satisfy the performance demands of the wide range of impact tools which are being marketed today.

BRIEF DESCRIPTION OF THE DRAWING

Several embodiments of the invention are described herein with reference to the accompanying drawing in which.

DESCRIPTION OF ILLUSTRATED EMBODIMENT

Figure 1:
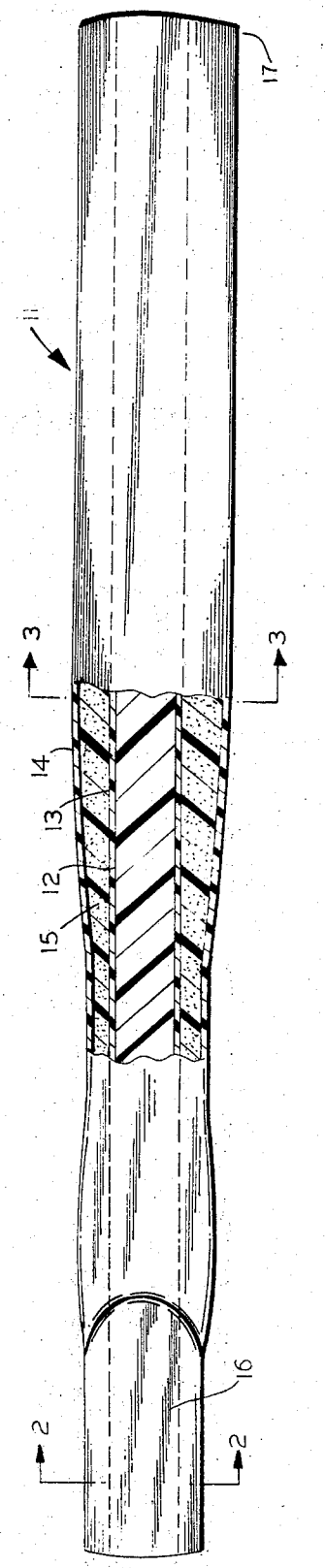
FIG. 1 is an elevation view, partly sectioned, of a version of the new handle intended for use in a claw hammer.

Referring to the drawing, the new handle comprises a body 11 of rigid structural plastic foam which has an average density on the order of 35–45 pounds per cubic foot and contains a central reinforcing core 12. Body 11 may be made from various plastics, such as polyethylene, polystyrene, polyurethane and polypropylene, but polypropylene is the presently preferred material because it appears to afford the best compromise between flexibility and strength. The plastic foam is molded to the desired shape around core 12, so the body 11 of the finished handle actually forms a shrink fit with the core. The molding operation inherently creates layers 13 and 14 adjacent the inner and outer peripheries of body 11 which have higher densities than the average, and an intermediate region 15 having a lower density. The thickness of layers 13 and 14 depends upon the radial width of body 11 and usually is about 0.040 to 0.050 inches. However, in the eye-engaging region 16, where body 11 has a rather thin cross section (e.g. less than one-fourth inch), the surface layers are thicker and actually constitute a major portion of the entire cross section of the body. This is an advantage because it facilitates the cutting or filing operations which may be necessary in order to fit the handle to the eye of a particular tool head.

Reinforcing core 12 is made from a material having a higher tensile strength than the plastic foam in body 11, and, for moderate size tools, such as claw hammers, it preferably consists of a solid rod of oval cross section made from polyester resin reinforced with glass fibers oriented in the longitudinal direction. This material, which is readily available on the commercial market, cooperates with body 11 to provide the strength needed for a safe handle, and is rigid enough to limit handle flexure as required to prevent cracking of the body. For some smaller tools, such as tack hammers, a similar rod of round cross section may be used. On the other hand, in the case of large handles for tools such as heavy sledges, axes and picks, cost or rigidity considerations may require use of a metal core. In these situations, it is recommended that the core be made from a steel or an aluminum tube of circular cross section. In all cases, it is desirable, from the standpoint of minimizing manufacturing costs, to use a core having a uniform cross section end-to-end. However, if excessive localized flexure is encountered, as it might be in the case of the enlarged, reverse tapered eye-engaging end of a pick handle, this difficulty can be corrected economically by merely using closely fitting sleeves to increase core cross section in the critical region. In this way, tapered or other specially molded and expensive cores are obviated.

Figure 3:
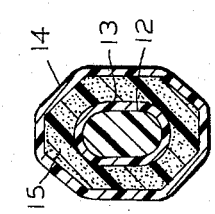
FIGS. 2 and 3 are sectional views taken, respectively, on lines 2—2 and 3—3 of FIG. 1.
Figure 2:
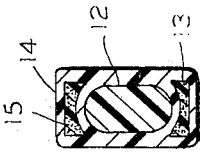

The external shape of the molded handle is selected to afford the strength, rigidity and balance needed for each type of tool, and, of course, the eye-engaging portion 16 is matched to the eye of the tool head. In the case of picks and some hoes, portion 16 is enlarged and reversely tapered, so the head is slipped onto the handle from the butt end 17 and is self-retaining. In the more common case, the head is fitted directly onto portion 16, and the handle is expanded into tight contact with the wall of the eye by means of a steel wedge driven into core 12. Usually the variations in the eye dimensions of heads of the same type are not great enough to require shaping of portion 16, but, if stock removal is needed, it can easily be accomplished using a knife or a file. Of course, if the handle protrudes too much from the far side of the head, the excess can be removed by cutting or sawing. The wedges used with handles, such as the one shown in FIGS. 1–3 having solid fiberglass cores, may be shaped similarly to those now used to attach wooden handles. On the other hand, handles using tubular cores require a wedge in the form of a tapered plug whose cross section matches that of the inside surface of the tube. After wedging, the exposed end of the handle may be dressed using a hot putty knife, inasmuch as the plastic foam melts at a low temperature of about 450° F. This dressing procedure creates across the end of the handle a layer of high density material similar to layers 13 and 14.

Since the new handle is molded, and attachment of the head requires little or no stock removal, it follows that the improved design guarantees substantially correct alignment of the head relative to the handle. It should also be noted that experience with the handle indicates that when the body 11 cracks, as a result of overstressing or a misblow, the core 12 provides structural integrity and prevents separation of the head. Finally, it should be observed that the structural foam material used in body 11 is a better shock and vibration absorber than is wood, thereby making the work easier and less tiring on the user.

We claim:

1. A replaceable handle for an impact tool comprising a molded body (11) of rigid structural plastic foam which surrounds a rigid reinforcing core (12) made of a higher strength material, said body (11) having high density regions (13, 14) at its inner and outer peripheral surfaces and an intermediate region (15) of lower density.

2. A handle as defined in claim 1 which has an eye-engaging portion (16) at one end in which the body (11) is composed essentially of said high density regions.

3. A handle as defined in claim 1 in which the core has an oblong cross section and extends longitudinally between the opposite ends of the handle.

4. A handle as defined in claim 3 in which the core (12) is a rod of polyester resin reinforced with glass fibers and has a uniform oval cross section end-to-end.

* * * * *

REEXAMINATION CERTIFICATE (253rd)

United States Patent
Gavillet et al.

[11] B1 3,770,033
[45] Certificate Issued Sep. 25, 1984

[54] MOLDED HANDLE FOR IMPACT TOOLS

[75] Inventors: Charles R. Gavillet, Carthage, Ill.; Dale L. Hagmeier; Gregory K. Harris, both of Keokuk, Iowa

[73] Assignee: Decker Manufacturing Co., Keokuk, Iowa

Reexamination Requests:
No. 90/000,067, Sep. 9, 1981
No. 90/000,101, Nov. 4, 1981

Reexamination Certificate for:
Patent No.: 3,770,033
Issued: Nov. 6, 1973
Appl. No.: 206,678
Filed: Dec. 10, 1971

[51] Int. Cl.³ .............................. B25G 1/10
[52] U.S. Cl. .................. 145/61 C; 145/61 H; 145/61 M
[58] Field of Search ............... 145/61; 264/DIG. 16

[56] References Cited
U.S. PATENT DOCUMENTS

| | | |
|---|---|---|
| 2,837,381 | 6/1958 | Sarlandt . |
| 2,940,492 | 6/1960 | Curry et al. . |
| 2,994,353 | 8/1961 | Yearley . |
| 3,025,061 | 3/1962 | Ernst et al. . |
| 3,115,912 | 12/1963 | Harris . |
| 3,147,975 | 9/1964 | Gruss et al. . |
| 3,220,731 | 11/1965 | Germino et al. . |
| 3,232,614 | 2/1966 | Abbat . |
| 3,359,351 | 12/1967 | Bender . |
| 3,432,582 | 3/1969 | Bender . |
| 3,445,113 | 5/1969 | Satchell et al. . |
| 3,478,134 | 11/1969 | Gruss et al. . |
| 3,578,825 | 5/1971 | Merrow et al. . |
| 3,712,659 | 1/1973 | Kneissl . |
| 3,762,453 | 10/1973 | Merrow et al. . |

OTHER PUBLICATIONS

Plastic Foams; vol. 11; Calvin J. Benning, Copyright 1969, p. 277.
"Structural Foam", The Society of the Plastics Industry, Inc., pp. 2 and 3.

*Primary Examiner*—James L. Jones, Jr.

[57] ABSTRACT

The disclosure concerns easily replaceable handles for impact tools, such as hammers, axes and sledges, which comprise a molded body made of a rigid structural plastic foam, and a reinforcing core made of a higher strength material.

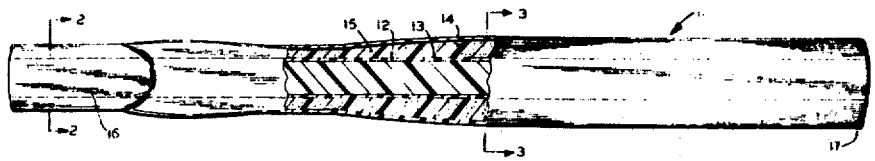

REEXAMINATION CERTIFICATE ISSUED UNDER 35 U.S.C. 307.

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-4 is confirmed.

New claims 5-11 are added and determined to be patentable.

*5. A replaceable handle for an impact tool having an eye-engaging region at one end and a hand grip region at the opposite end, and consisting of a body of rigid structural plastic foam molded about a rigid reinforcing core made of a higher strength material, said structural foam body having high and low density regions at its inner and outer peripheral surfaces and an intermediate region of lower density, the core extending from the eye-engaging end into the hand grip region and the structural foam body extending over at least the entire length of the core outside the eye-engaging region and having a contoured external shape of nonuniform cross section which includes an integral, finished hand grip in said hand grip region, whereby the structural foam body coacts with the core to determine the structural integrity, flexibility and balance of the handle, protects the core against overstrike damage in the zone between the eye-engaging and hand grip regions, and reduces shock transmission to the hand of the user by absorbing internally shocks imposed on the handle by the impact tool.*

*6. A handle as defined in claim 5 in which the structural foam body has an integral portion in the eye-engaging region which is composed essentially of said high density regions.*

*7. A handle as defined in claim 6 in which the core has a uniform cross section throughout its length and comprises a synthetic resin matrix containing reinforcing fibers oriented longitudinally of the handle.*

*8. A handle as defined in claim 1 in which said molded body is made of polypropylene structural foam; and said core is a fiberglass rod.*

*9. A handle as defined in claim 8 which is shaped and sized for large, heavy impact tools, such as axes and mauls.*

*10. A handle as defined in claim 5 in which said molded body is made of polypropylene structural foam; and said core is a fiberglass rod.*

*11. A handle as defined in claim 10 which is shaped and sized for large, heavy impact tools, such as axes and mauls.*

* * * * *